United States Patent [19]

Mastromoro et al.

[11] Patent Number: 4,797,909
[45] Date of Patent: Jan. 10, 1989

[54] REMOTELY PROGRAMMABLE TELEPHONE ANSWERING SYSTEM WITH IMMEDIATE VERIFICATION UPON ENTRY

[76] Inventors: John F. Mastromoro, 3603 Brompton Ct., Liverpool, N.Y. 13090; Richard W. French, 609 Vine St., Liverpool, N.Y. 13088; Samuel S. Strobert, 5892 Sutton Dr., Clay, N.Y. 13041

[21] Appl. No.: 836,768

[22] Filed: Mar. 6, 1986

[51] Int. Cl.⁴ .............................................. H04M 1/64
[52] U.S. Cl. ........................................ 379/67; 379/88; 379/76; 379/77
[58] Field of Search ................ 379/76, 77, 89, 142, 379/88; 381/51, 67

[56] References Cited

U.S. PATENT DOCUMENTS

| | | | |
|---|---|---|---|
| 4,327,251 | 4/1982 | Fomenko et al. | 381/51 |
| 4,484,036 | 11/1984 | Lyle et al. | 379/373 X |
| 4,518,827 | 5/1985 | Sagara | 379/88 |
| 4,585,907 | 4/1986 | Giammarrusco | 379/88 |

FOREIGN PATENT DOCUMENTS 0057854  8/1982  Fed. Rep. of Germany ..... 179/6.16
2098433  11/1982  Fed. Rep. of Germany ........ 381/51
0015556  1/1986  Japan ............................. 179/90 AN Primary Examiner—James L. Dwyer
Attorney, Agent, or Firm—Charles S. McGuire

[57] ABSTRACT

A telephone answering system including a locally or remotely programmable voice synthesizer for transmitting messages is disclosed. The answering system is connected to a particular (local) telephone and is actuated in the usual manner by an incoming call to transmit a predetermined message. The message consists of a sequence of individual words, pauses, or other message segments which are stored in the synthesizer and transmitted in a desired sequence determined by pressing corresponding keys of either the phone to which the system is connected or any remote phone. As the operator of the system presses each key to program a desired message, the word or other message segment is immediately transmitted for the user to hear, thereby providing positive verification of entry. Changes or corrections may be made at any time to one or more individual message segments without the necessity of re-entering the entire message.

11 Claims, 2 Drawing Sheets

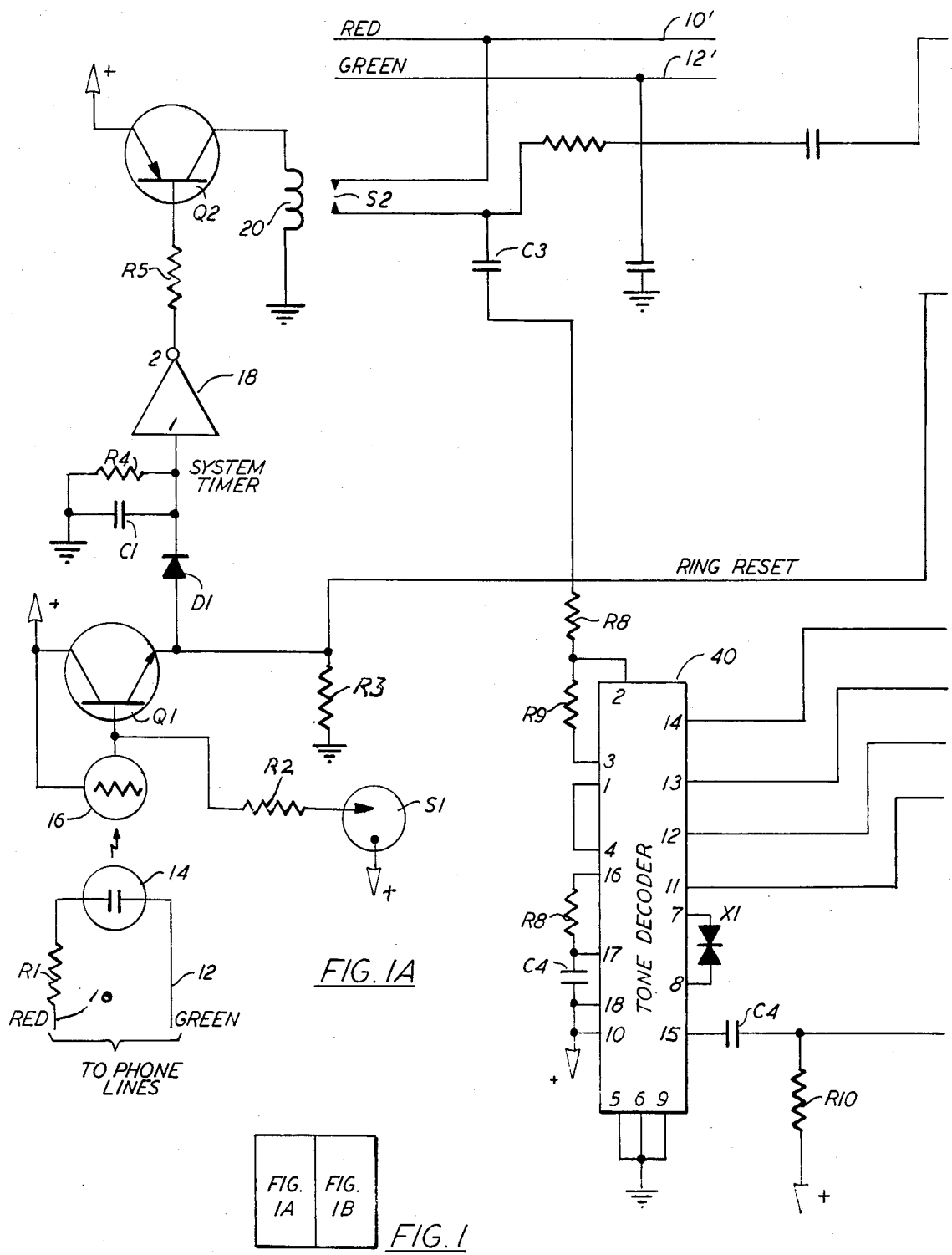

REMOTELY PROGRAMMABLE TELEPHONE ANSWERING SYSTEM WITH IMMEDIATE VERIFICATION UPON ENTRY

BACKGROUND OF THE INVENTION

The present invention relates to automatic telephone answering and message transmitting systems and, more particularly, to an answering system including a voice synthesizer which may be programmed to repeat any of a plurality of pre-recorded words in a desired sequence.

Most of the automatic telephone answering systems in use today employ an audio tape recorder for transmitting a stored message to greet and instruct callers and then to record a verbal message given by the caller. In some systems, the user may listen to the recorded messages from a remote telephone by activating the home unit with a tone of predetermined frequency transmitted by an electronic device, or by other means. Also, certain answering systems include the capability of messages being entered, or "slotted" in certain parts of the cassette tapes to be played back only by using special code procedures; this principle may also be used in recording messages on such machines.

More sophisticated systems include microprocessors with tapes and disks to provide more elaborate services, including voice synthesizers for any required purpose advantageous to system operation. However, such systems are often suited for use only with special telephones and, in any case, are both expensive and bulky. Furthermore, none of the aforementioned systems, regardless of cost or complexity, may be operated from a remote, conventional, keyed telephone to program a voice synthesizer to transmit a desired message to callers, and to verify proper entry of the program by transmitting each segment as it is entered.

It is a principal object of the present invention to provide novel and improved telephone answering equipment including a voice synthesizer which may be selectively programmed from any remote telephone to transmit a series of individual words constituting a desired message to callers.

Another object is to provide a telephone answering system wherein a voice synthesizer is selectively programmed by pressing individual keys of the telephone keypad and each word or other message segment is transmitted to the user immediately upon entry to verify that the desired data has been entered.

A further object is to provide a telephone answering system wherein a message for callers is programmed into a voice synthesizer in serial fashion and any desired segment of the message may be changed selectively and individually.

Other objects will in part be obvious and will in part appear hereinafter.

SUMMARY OF THE INVENTION

In accordance with the foregoing objects, the telephone answering system of the present invention comprises a unitary, compact electronic package for connection to the incoming leads of a conventional, keypad telephone. The package includes a voice synthesizer with a plurality of individual, pre-recorded message segments which may be accessed in any sequence to provide a desired message for callers. The synthesizer is programmed by pressing keys on the keypad of either the phone to which the device is connected or those of any remote phone which is in communication with the device-connected phone.

The device also provides immediate verification to the user of the message segments as they are entered. That is, upon pressing each key or key sequence used to program the synthesizer, the word or other message segment corresponding thereto is voiced over the phone line. Thus, the user can hear the message, word by word, as it is entered without the necessity of replaying the complete message which, with most conventional systems, could require hanging up and re-calling the telephone to which the device is connected when entering the message from a remote phone.

Unique circuit features provide the further capability of changing any message segment without the necessity of re-entering the entire message. A particular key, e.g., the # key, on the conventional telephone keypad is pressed to activate the synthesizer correction mode, and the pressing of a subsequent key or keys corresponding to the desired message segment will replace the formerly entered message segment with the one desired.

The implementation of these and other features of the invention will be apparent from the following detailed description, taken in connection with the accompanying drawing.

DETAILED DESCRIPTION

Figure 1B:
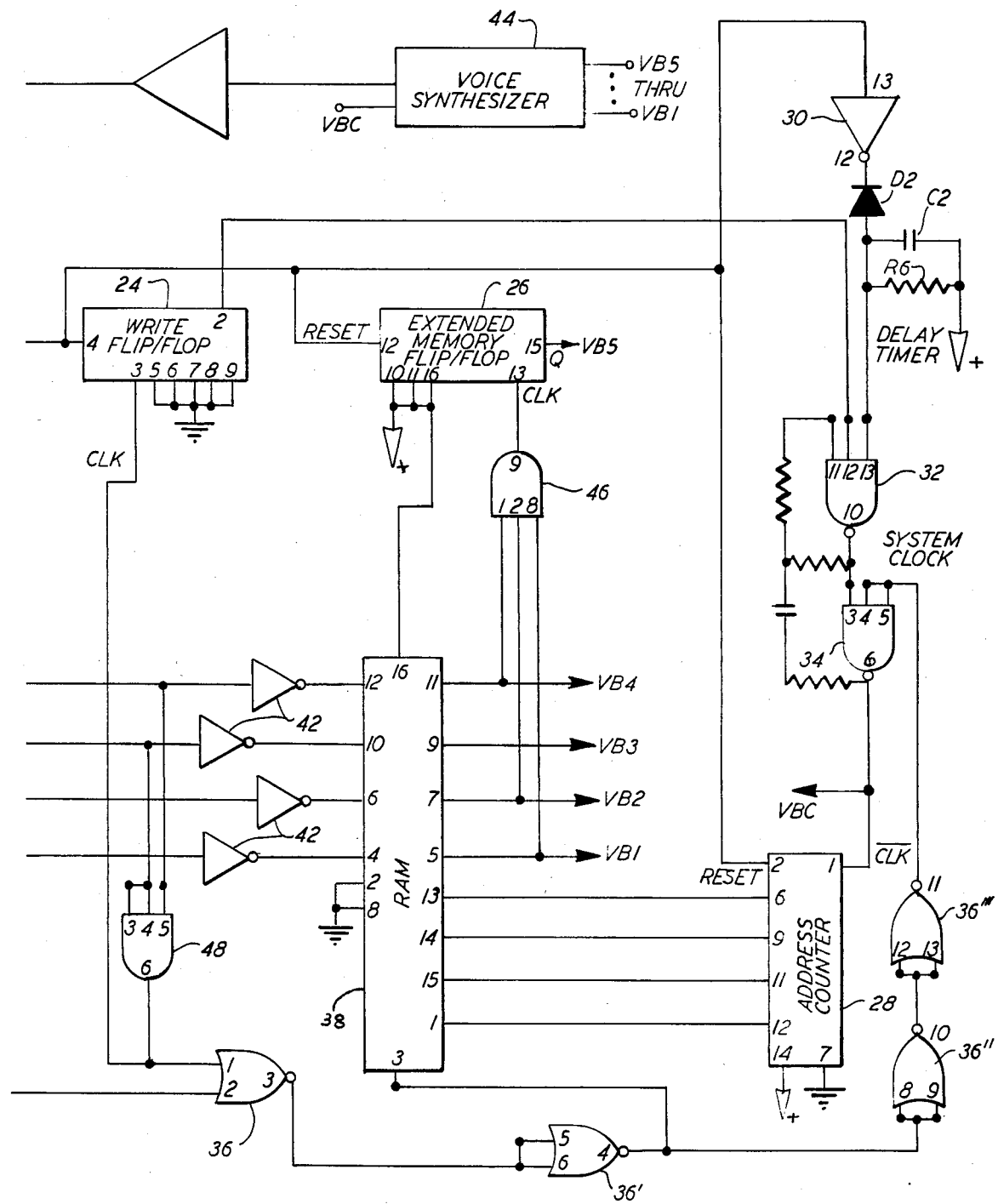
FIG. 1 shows the relative placement of the two sheets to form a single, continuous, schematic circuit diagram; and 1A and 1B form the left and right halves, respectively, of a continuous schematic diagram of a preferred embodiment of an electronic package forming the automatic telephone answering system of the invention.

Referring now to the drawing, electrical leads 10 and 12 are provided with suitable, conventional connecting means (not shown) for selective connection of the device to the usual red and green leads of the incoming telephone line.

Neon bulb 14 is connected between leads 10 and 12, in series with current-limiting resistor R1. Bulb 14 will be activated by a ring signal on the telephone line to emit light that is received by photocell 16. The resulting signal from photocell 16 is applied to the base of transistor Q1, turning the transistor on and creating a positive or high state at the emitter. Photocell 16 is also connected, through bias resistor R2, to normally open pushbutton switch S1, for purposes explained in more detail later. The high state at the emitter of transistor Q1 is connected to resistor R3 and is present as a pulse approximately 1 millisecond in duration. The pulse is termed the "ring reset" pulse and is also connected to the input of diode D1 to forward bias the diode, which forms part of the SYSTEM TIMER circuit, together with the RC timing network consisting of resistor R4 and capacitor C1.

The ring reset pulse from diode D1 is also applied to pin 1 of inverter 18, causing pin 2 thereof to reverse to a low state, placing the necessary bias across resistor R5 and the base of transistor Q2. The emitter of transistor Q2 is connected to coil 20 of a single pole-single throw relay, whereby the turning on of transistor Q2 closes relay switch S2. Switch S2 remains closed for the time, e.g., 60 seconds, established by the SYSTEM TIMER. Switch S2 is connected in parallel with the phone hook switch (not shown) and the closing of switch S2 has the same effect as removing the receiver from the hook. After the first ring signal, the phone stops ringing and the remote or calling phone is placed in communication with the local phone, i.e., the phone to which the answering system of the invention is connected, for the time interval established by the SYSTEM TIMER.

The 1 millisecond ring reset pulse from the emitter of transistor Q1 is also connected to pin 4 of integrated circuit chip 24, termed the WRITE FLIP FLOP, pin 12 of integrated circuit 26, the EXTENDED MEMORY FLIP FLOP, and to pin 2 of integrated circuit 28, the ADDRESS COUNTER. The pulse resets each of these integrated circuits to their required initial or starting conditions, and the complete operation of each IC will be described later. The ring reset pulse is also connected to pin 13 of inverter 30, causing a reverse in polarity to a low state at output pin 12, which is passed through diode D2 to activate the DELAY TIMER network, consisting of resistor R6 and capacitor C2.

The low state placed at pin 13 of NAND gate 32 forces its output at pin 10 to a high state which is applied to pin 3 of NAND gate 34. A high state is also applied to pins 4 and 5 of NAND gate 34 by the normal high state present at pin 11 of a NOR gate, the four elements of which are denoted by reference numerals 36, 36', 36" and 36'''. NAND gates 32 and 34 are connected to operate as a free-running oscillator, termed the SYSTEM CLOCK, except when any output is forced to remain in a stable state, as is the case during the time interval, e.g., 5 seconds, established by the DELAY TIMER network. The SYSTEM CLOCK is designed to produce a pulse train at pin 6 of NAND gate 34 at a rate of approximately 1.5 pulses per second when free-running. This occurs upon either of two events, i.e., the expiration of the time interval established by the DELAY TIMER network or the entry of a "write" command, as explained later.

The DELAY TIMER serves two purposes essential to circuit operation. First, it requires that operation of the SYSTEM CLOCK be initiated by transition from a low to a high state, which is necessary for proper phasing of "read" and "write" commands, as well as to provide immediate verification of entry of a message, all as explained in more detail later. The second purpose of the DELAY TIMER is to provide adequate time for entry of the above mentioned "write" command, and to insure that the system always starts at the beginning of a message, whether it is being entered or transmitted.

The output of the SYSTEM CLOCK at pin 6 of gate 34 is applied to a terminal labeled "VBC" and to pin 1 of previously mentioned ADDRESS COUNTER 28, a sequentially operated binary counter, which serves to store and retrieve messages in a desired order from integrated circuit 38, a RANDOM ACCESS MEMORY. In the disclosed system, a four-bit binary input is provided from pins 6, 9, 11 and 12 of ADDRESS COUNTER 28 to pins 13, 14, 15 and 1, respectively, of RAM 38, whereby a total of 16 (0 through 15) memory locations are available for access in sequential order, although more (or less) could be provided, if desired. It is also noted that extending the range of integrated circuits 28 and 38 would permit two or more complete messages to be isolated from one another, i.e., to be "slotted" in the memory for selective, individual retrieval. This would require a code routine to be provided in the address circuitry and, although certainly a viable possibility, is not included in the present description to avoid unnecessary complication of the disclosure of the basic system.

Data from RAM 38 is accessed by the individual keys of any conventional telephone keypad, which is designed to emit a distinctive "dual-tone" output for each key pressed. These signals are received in the usual manner through leads 10' and 12' of the phone line and are coupled to integrated circuit 40, termed the TONE DECODER, through capacitor C3 and resistor R8 to pin 2, and further through resistor R9 to pin 3. TONE DECODER 40 deciphers the input signals from the keypad in conventional fashion and presents binary coded outputs corresponding thereto as high states present at any combination of pins 11, 12, 13 and 14 of TONE DECODER 40. These pins are connected to pins 4, 6, 10 and 12, respectively, of RAM 38 through inverters, each denoted by reference numeral 42, whereby the high states present at the active pin(s) of TONE DECODER 40 are presented as the low inputs required by RAM 38 which, in turn, electronically inverts the signals back to a high state at its output pins 5, 7, 9 and 11.

The outputs of RAM 38, in binary format, are labeled VB1 through VB4 and are connected directly to correspondingly labeled input lines of VOICE SYNTHESIZER 44, which is also connected, as indicated, to the previously mentioned VBC output at pin 6 of gate 34, the SYSTEM CLOCK. The outputs at pins 5, 7 and 11 of RAM 38 are also connected to pins 8, 2 and 1, respectively of AND gate 46. High states at all three of these pins correspond to the decimal number 11, which is produced by a signal associated with the key marked "*" on the telephone keypad. When all inputs to AND gate 46 are high, the output at pin 9 thereof is also high, providing a clock pulse to EXTENDED MEMORY FLIP FLOP 26. This produces a high state at output pin 15 of the latter, the output VB5 being connected to the corresponding input of VOICE SYNTHESIZER 44, representing, in binary terms, the decimal number 16.

Output pin 13 of TONE DECODER 40 is connected to pins 3 and 4 of AND gate 48, and pin 14 of the former is connected to pin 5 of the latter, all in advance of inverters 42. A high state at both pins 13 and 14 corresponds to the number 12, which is produced by a signal associated with the key marked "#" on the telephone keypad. Since this provides a high input at all of pins 3, 4 and 5 of AND gate 48, the corresponding high state at output pin 6 thereof is also present as an input at pin 1 of NOR gate element 36. It is noted that this condition is present only when the # key is pressed, and is released upon pressing any other key. A high state at either input pin 1 or 2 of NOR gate element 36 produces a low state at the output pin 3; thus, the high state which is present at pin 1 when the # key is pressed is a disabling factor, preventing this signal (corresponding to the number 12) from being entered in the system memory, as explained in more detail later.

TONE DECODER 40 also provides a "strobe output" feature at pin 15. Immediately upon a signal being received at input pins 2 and 3 of TONE DECODER 40 in response to the pressing of any key on the telephone keypad a high state is produced at pin 15, which is not returned to its normal low state until the key is released. A "strobe delay" is provided by capacitor C4 and resistor R10. That is, when the key is released, returning pin 15 to a low state, the low state is present at pin 2 of NOR gate element 36 for a time period corresponding to the strobe delay, e.g., approximately 1.5 milliseconds, established by the strobe delay components. The low state at pin 2 of NOR gate element 36 would produce a high at output pin 3 which is passed to pins 5 and 6 of NOR gate element 36' which, in turn, provides a low state at pin 4 thereof. Pin 4 is connected to pins 8 and 9 of the next NOR gate element 36" and to pin 3 of RAM 38. Thus, the low state at pin 4 of NOR gate element 36' provides a low state at pin 3 of RAM 38, and is inverted to a high and back to a low state by series connected NOR gate elements 36" and 36''', thus presenting a low state at pins 4 and 5 of NAND gate 34.

When a message is to be entered into RAM 38, communication is initially established between the keypad of the telephone by which entry is to be made and the system of the invention. A message may be entered from the keypad of the local phone, i.e., the same phone to which the system is connected, by closing previously mentioned push-button switch S1. This places a high state at the base of transistor Q1 to produce a ring reset pulse in the manner previously described, and activates the system to accept signals from the keypad of the local phone. On the other hand, if a message is to be entered from a remote telephone, the latter is placed in communication with the local phone simply by calling the number of the local phone and the initial ring will actuate neon bulb 14 and photocell 16, producing the ring reset pulse and initializing the system as previously described.

When the keypad of the phone from which the message is to be entered has been placed in communication with the system, the user presses the # key, producing a binary 12 at pins 13 and 14 of TONE DECODER 40. This produces a high state at pin 6 of AND gate 48 and disables NOR gate 36, preventing its normally low state at output pin 3 from going to a high state, and further preventing pin 3 of RAM 38 from going to a low state, as is necessary to enter data into RAM 38.

Pin 6 of AND gate 48 is also connected to pin 3 of WRITE FLIP FLOP 24. The high state transmitted to pin 3 clocks a low state at output pin 2 of WRITE FLIP FLOP 24, which is connected directly to pin 12 of NAND gate 32. This prevents operation of the SYSTEM CLOCK in the same manner as previously described in connection with the DELAY TIMER circuit. However, the SYSTEM CLOCK will now be prevented from operating for as long as required for the user to enter the desired message into RAM 38 rather than for the predetermined time period established by the DELAY TIMER network. WRITE FLIP FLOP 24 is reset by the ring reset pulse, applied to pin 4 thereof, either by a ring signal received at the local phone or by the user manually closing switch S1.

EXTENDED MEMORY FLIP FLOP 26 causes output VB5 to go to a high state in response to a binary 16 signal, produced by pressing the "*" key on the telephone keypad, causing a high state at the VB5 input of VOICE SYNTHESIZER 44. This allows the "extended memory" of RAM 38 to be accessed; that is, when a number key is pressed after the "*" key, its value is added to the binary 16. Thus, pressing the "1" key after the "*" key accesses the memory location assigned to number 17, and so on. Once the "*" key is pressed, extended memory locations will continue to be accessed until the "*" key is pressed again, removing the VB5 input to VOICE SYNTHESIZER 44.

In the present system, it is assumed that VOICE SYNTHESIZER 44 contains pre-recorded "message segments" corresponding to each of the ten single digit decimal numbers, and nine additional, individual words. Conventional voice synthesizers are commercially available which may be pre-recorded or "programmed" to a user's request. The message segments are accessed from the synthesizer by a triggering signal from a binary address format unique to each segment, with a complete message comprising a discrete number of segments determined by the custom programming of the particular synthesizer. In the present system, it is assumed that synthesizer 44 is programmed to transmit a message consisting of 15 segments which may be any combination of the aforementioned spoken decimal numbers, individual words, or pauses.

The system includes a suitable power supply circuit (not shown) which provides 5 vD.C. power to each of the terminals marked "+" in the schematic drawing. Preferably, the power supply includes a power transformer for stepping down 110 vA.C. line power to 10 vA.C., a bridge rectifier and a 5 vD.C. voltage regulator. Also, a 6 vD.C. battery back-up would be connected to the system supply line through a trickle charge resistor and diode combination, permitting the battery to be continually charged and used in the event of line power failure. The entire system has a very low power requirement because of the use of CMOS components and the battery back-up guarantees long term memory retention in RAM 38.

In the disclosed system, the ten number keys on the telephone keypad may be used to enter in RAM 38 the binary codes corresponding to each of the ten decimal numbers. The individual words are entered in extended memory by pressing the "*" key, entering a binary 16, followed by a sequence of keys 1–9, and a pause by key 0. Thus, a typical address format with the corresponding voiced message segment in the synthesizer might be as follows:

| ADDRESS | VOICED MESSAGE SEGMENT | ADDRESS | VOICED MESSAGE SEGMENT |
|---|---|---|---|
| 1 | one | "*"+1=17 | I'm |
| 2 | two | +2=18 | out |
| 3 | three | +3=19 | please |
| 4 | four | +4=20 | call |
| 5 | five | +5=21 | later |
| 6 | six | +6=22 | sleeping |
| 7 | seven | +7=23 | tomorrow |
| 8 | eight | +8=24 | at |
| 9 | nine | +9=25 | number |
| 0 | zero | +0=26 | pause |

An example of a complete message to be transmitted to callers might be, "I'm out, please call at number 471-0361." This message would be entered by the user as follows:

Establish communication with local phone either by closing switch S1 or by calling the number of the local phone from a remote phone.

Press the "#" key to activate the system to receive a message.

Press "*" key, plus keys 1, 2, 3, 4, 8, 9 (corresponding to voiced message segments I'm, out, please, call, at, number)

Press the "*" key again to release extended memory.

Press 4, 7, 1, 0, 3, 6, 1 (corresponding to voiced message segments four, seven, one, zero, three, six, one)

Press the "*" key to again enter extended memory.

Press the 0 key twice, thereby filling the remainder of the 15 message segment slots with pauses (which may be entered at locations other than the end of the message if desired.)

An important feature of the system is the instant verification that each desired message segment has been entered. The output of the synthesizer is connected, through an amplifier, to the speaker of the local phone. Thus, each message segment is heard by a caller in communication with the local phone, including a user in the process of entering a message in the memory, as it is voiced out by the synthesizer. That is, immediately upon release of each key pressed to enter a message segment (excepting, of course, the "#" and "*" keys), the voiced message will be transmitted to the user entering the message. The circuitry is so designed that the message segment must be entered into memory before it is voiced out from the synthesizer.

Another feature provided by the system is the capability for the user to enter corrections (i.e., to change a message segment) at any desired point in the message. Of course, an entire message may be rewritten at any time simply by re-establishing communication with the local phone, pressing the "#" key and entering a new message. However, if the user wishes to change only a single message segment, or other portion of the message, after entry it is only necessary to stop, re-establish communication with the local phone in the manner previously indicated, let the message play back to the point just prior to the error (i.e., to the last correct message segment), press the "#" key, and enter the desired segment. Again, the synthesizer will voice back the message segment entered to provide immediate verification of accuracy.

Once a message is entered in memory, it will be transmitted in response to any ring signal received at the local phone. The system is always in the transmit or "read-out" mode when activated from the initialized condition by a ring reset pulse, as described. The message will be transmitted twice and the system will then shut itself off and release the phone line. Once entered, a message will remain as long as the system receives power or until changed by the user. From the foregoing it may be seen that the system of the present invention operates to provide true "phone answering" capability, conveying a message to those calling the local phone of where and/or when to contact the intended recipient of the call. The user may, for example, leave a message instructing callers to call at another number and later change the message from a remote phone, to give a different instruction as to where or when to call. The system provides immediate verification to the user of each message segment as it is entered, as well as the capability of making corrections by changing individual message segments without the necessity of re-entering the entire message. The entire system may easily be packaged in a pocket-size format, making it easily portable and connectible at any telephone location.

What is claimed is:

1. An automatic telephone answering system for transmitting to a caller a message formed by a plurality of message segments, the sequency of the segments being pre-selected by a user through the keypad of either the local telephone to which the system is connected or any remote telephone in communication with the local telephone, a unique electrical signal being associated with each key on the telephone keypad, said system comprising:

(a) means for connecting said system to the incoming leads of a conventional, local telephone;
    (b) a voice synthesizer containing a plurality of individual, pre-recorded message segments for transmission in a predetermined sequence determined by a series of electrical signal inputs to said synthesizer, each of said signal inputs being uniquely associated with a corresponding one of said message segments;
    (c) a random access electronic memory device adapted to receive and store a sequence of said unique electrical signals from the individual keys of said keypad in the order pressed by the user, each of said unique electrical signals corresponding to a unique memory location of said memory device, and to generate said sequence of electrical signal inputs in response to a ring signal received at said local telephone;
    (d) a tone decoder integrated circuit connected between said incoming leads and said memory device, and adapted to emit a binary coded signal corresponding to each of said electrical signals, said tone decoder being connected to said memory device by a plurality of separate lines, each corresponding to a digit position in said binary coded signal;
    (e) circuit means connecting said memory device with said synthesizer for input to the latter of said signal inputs;
    (f) means electrically connecting the output of said voice synthesizer to the speaker of said local telephone;
    (g) means for generating a system reset pulse of short duration in response to a ring signal at said local telephone; and
    (h) a plurality of individual, integrated circuit, flip flop means to which said reset pulse is connected, including a write flip flop and an extended memory flip flop, each adapted to generate a clock pulse in response to said reset pulse.

2. The invention according to claim 1 and further including a sequentially operated binary counter adapted to address binary coded messages to said random access memory for storage therein and retrieval therefrom.

3. The invention according to claim 2 and further including a free-running oscillator adapted to emit a pulse train at a predetermined rate which is provided as an input to said counter.

4. The invention according to claim 3 and further including a first timing network adapted to receive said reset pulse and to inhibit said free-running oscillator from emitting said pulse train for a first predetermined time period thereafter.

5. The invention according to claim 4 and further including relay means operable in response to said reset signal to close a relay switch connected in parallel with the receiver hook switch of said local telephone.

6. The invention according to claim 5 and further including a second timing network adapted to receive said reset pulse and operable to open said relay switch a second predetermined time interval thereafter.

7. The invention according to claim 6 wherein the output of said free-running oscillator is connected directly to said voice synthesizer.

8. The invention according to claim 1 and further including means responsive to a signal received from a first, non-digitally designated key of said keypad to provide a first, predetermined one of said electrical signals as an input to said memory device, and wherein said circuit means comprises a plurality of individual lines directly connecting said memory device with said synthesizer and an additional line connecting a predetermined group of said individual lines to gate means and thence through a further individual line to said synthesizer.

9. The invention according to claim 8 wherein said gate means comprises an AND gate having inputs from each of said predetermined group of individual lines and providing an output when signals are present on all lines of said predetermined group.

10. The invention according to claim 9 and further including flip flop means interposed between said AND gate and said synthesizer.

11. An automatic telephone answering system for transmitting to a caller a message formed by a plurality of message segments, the sequence of the segments being pre-selected by a user through the keypad of either the local telephone to which the system is connected or any remote telephone in communication with the local telephone, a unique electrical signal being associated with each key on the telephone keypad, said system comprising:
(a) means for connecting said system to the incoming leads of a conventional, local telephone;
(b) a voice synthesizer containing a plurality of individual, pre-recorded message segments for transmission in a predetermined sequence determined by a series of electrical signal inputs to said synthesizer, each of said signal inputs being uniquely associated with a corresponding one of said message segments;
(c) an electronic memory device adapted to receive and store a sequence of said unique electrical signals from the individual keys of said keypad in the order pressed by the user, each of said unique electrical signals corresponding to a unique memory location of said memory device, and to generate said sequence of electrical signal inputs in response to a ring signal received at said local telephone;
(d) circuit means connecting said memory device with said synthesizer for input to the latter of said signal inputs;
(e) means electrically connecting the output of said voice synthesizer to the speaker of said local telephone;
(f) means for generating a system reset pulse of short duration in response to a ring signal at said local telephone, said reset pulse generating means including a light emitting means actuable in response to said ring signal, photoelectric means for receiving light from said light emitting means and generating said reset pulse in response thereto, and a transistor having a base connected to the output of said photoelectric means; and
(g) a normally open, manually actuated switch connected between said transistor base and a source of electrical power, whereby said reset pulse may be alternatively generated by either said ring signal or by momentary closing of said normally open switch.

* * * * *